July 27, 1954

R. A. KAPLAN 2,684,738

ROTARY IMPACT TOOL

Filed Dec. 27, 1949

INVENTOR.
Reuben A. Kaplan
BY
A R McCrady
Attorney.

July 27, 1954

R. A. KAPLAN 2,684,738

ROTARY IMPACT TOOL

Filed Dec. 27, 1949

INVENTOR.
Reuben A. Kaplan
BY
A. R. McCrady
Attorney.

Patented July 27, 1954

2,684,738

UNITED STATES PATENT OFFICE 2,684,738

ROTARY IMPACT TOOL

Reuben A. Kaplan, Owatonna, Minn.

Application December 27, 1949, Serial No. 135,112

3 Claims. (Cl. 192—30.5)

This invention relates to a device for driving threaded elements such as nuts, screws and taps, and more particularly to a motor operated nut runner or the like for applying impact to enable the tool to exert a high torque under certain operating conditions.

The invention makes use of energy accumulating means combined with a torque-responsive clutch to convert the relatively uniform rotation of a prime mover such as an electric motor into a series of intermittent rotational blows imparted to the nut or other member to be driven. The torque-responsive clutch is of special type wherein the interengaging elements move radially with respect to each other in order to engage and disengage, being moved to disengaged position by a cam which moves axially of the tool when the torque being applied to the work exceeds a predetermined amount.

An object of the invention is to provide a tool of a character indicated which is of improved operating characteristics, sturdy and dependable in use, and easily manufactured and serviced.

A further object of the invention is to provide a tool which is subject to a minimum of longitudinal vibration, and wherein the operator of the tool is subjected to a minimum of torque reaction upon impact.

A further object of the invention is to provide a tool having improved cam means having low friction characteristics.

Further objects and advantages of the invention will be apparent from the following description, taken in connection with the appended drawings, in which.

Figure 1:
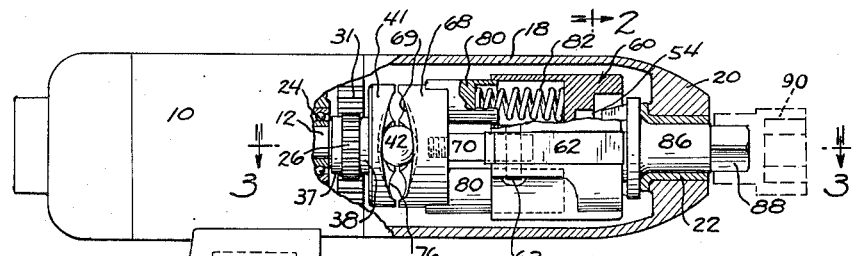
Fig. 1 is a view in side elevation, with parts broken away, of a tool embodying the invention, showing the parts in the positions which they occupy when the tool is not operating.
Figure 2:
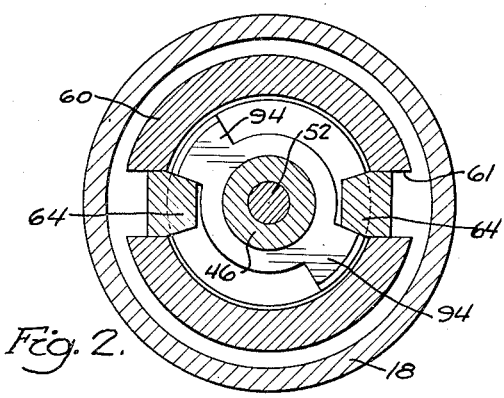
Fig. 2 is an enlarged fragmentary sectional view taken on the line 2—2 of Fig. 1.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The tool shown in the drawings comprises a housing 10 which houses a reversible motor (not shown) of any suitable type, such as an electric motor or a compressed air motor, operating to rotate a drive shaft 12. The housing 10 is supported by means of a hand grip 14 having a trigger 15 which controls the motor, as by means of a switch or a valve, indicated schematically at 16. The motor may be supplied with energy through a conduit 17. Forwardly of the housing 10 and fixed thereto is a cylindrical casing 18, having its forward end 20 reduced to retain a bushing or bearing 22, for a purpose to be described.

Figure 3:
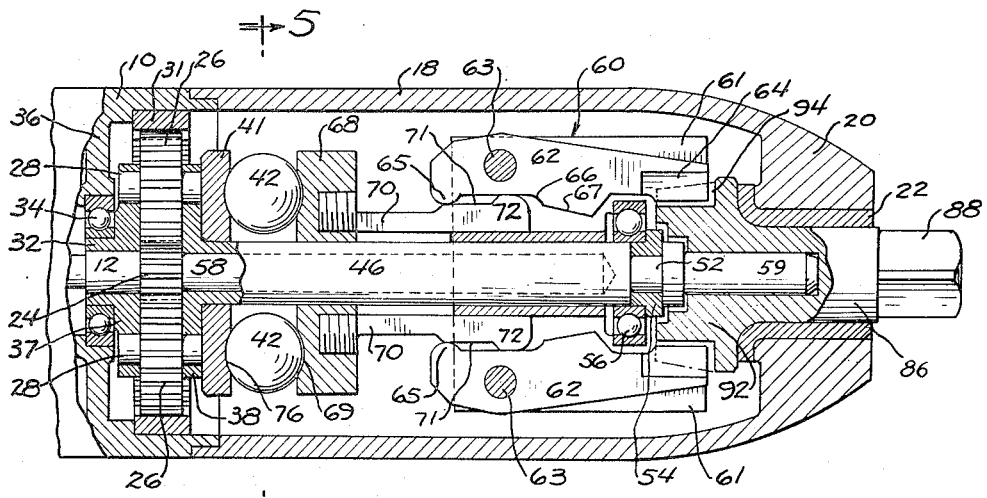
Fig. 3 is an enlarged view in longitudinal section of the mechanism taken on the line 3—3 of Fig. 1.
Figure 6:
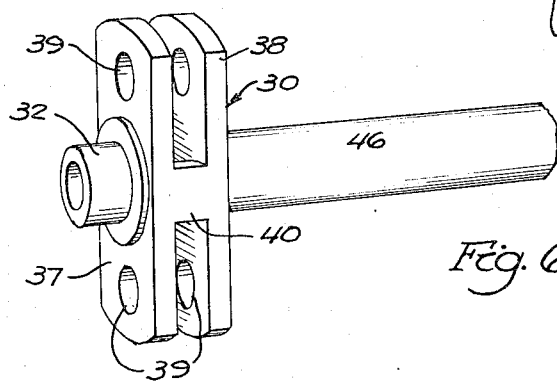
Fig. 6 is a perspective view of a detail of the mechanism.

The forward end of shaft 12 is formed with a pinion 24 (Fig. 3) which engages a plurality of planet gears 26 rotatable on stud shafts 28 carried by a carrier member 30. Planet gears 26 engage a fixed orbit gear 31, in the usual manner of a planetary gear system. The gears 24, 26 and 31 thus form a reduction gearing which steps the speed of shaft 12 down to a lower speed on the part of carrier 30. The carrier 30 is formed with a sleeve 32 which is rotatable on the shaft 12 and is journaled in a bearing 34 mounted in an annular flange 36 at the forward end of housing 10. As seen in Fig. 6, the carrier member 30 comprises two spaced elongated plates or bars 37, 38 having rounded ends, with bores 39 in said ends to accommodate the stud shafts 28, and fixedly spaced from each other by means of lugs 40, which may be welded in place, thus forming a rigid frame or carrier which embraces the planet gears 26 to retain them in position.

To the forward face of carrier member 38 is fixed a rotary cam member 41 which engages a plurality of ball members 42, as described more fully hereinafter.

A drive spindle 46 is formed integral with or secured to member 38 and extends axially of the casing 18. The spindle is formed with a reduced portion 52 which receives a split stepped keeper ring 54 which abuts against a bearing 56 to retain the parts in assembled relation. The spindle 46 is bored throughout the major portion of its length, and is machined to receive an extension 58 of the shaft 12 in rotatable relation. The forward end of the spindle 46 is reduced as indicated at 59.

An inertia member or hammer 60 is rotatably mounted on the spindle 46, the main body of the hammer being in the form of a sleeve or barrel concentric with the spindle. The hammer is formed with two diametrically opposite longitudinal slots 61 in each of which is mounted an impact lever 62 on a pivot pin 63 and having its forward end formed as a striker lug 64 designed to deliver impacts to the wrench head as described hereinafter. The inner surface of each lever 62 is formed with longitudinally spaced rounded bosses 65 and 66, with an inwardly inclined cam surface 67 forwardly of boss 66, to be engaged by the reciprocable cam member hereinafter described.

Rotatably and reciprocably mounted on the spindle 46 is an annular cam actuating member 68 the rear face of which is formed with a pair of annular cam grooves 69 in which ride the balls 42, which constitute spherical cam elements for transmitting forward thrust from member 41 to member 68.

Fixedly threaded into the forward face of member 68 and projecting forwardly therefrom into slots formed in hammer 60 are two reciprocable cam members 70, each comprising a horizontal surface 71 terminating in a rounded boss 72. The relation of these cam elements to bosses 65 and 66 and surface 67 on the juxtaposed levers 62 is such that as the cam members 70 are moved forwardly by member 68 from the position indicated in Figs. 1 and 3, the boss 72 on each member 70 will engage the rounded boss 66 on the corresponding lever 62 and tilt the lever about pivot pin 63, thus moving into engagement with surface 67, and moving striker lug 64 outwardly to the position shown in Fig. 4, wherein it is out of contact with its opposed anvil lug. Upon the return stroke of member 68, the striker lug 64 will be maintained in disengaged position until boss 72 reaches boss 66 and surface 71 passes beyond boss 65, whereupon the striker lug 64 will be moved quickly and positively into engagement with its hammer lug.

Figure 5:
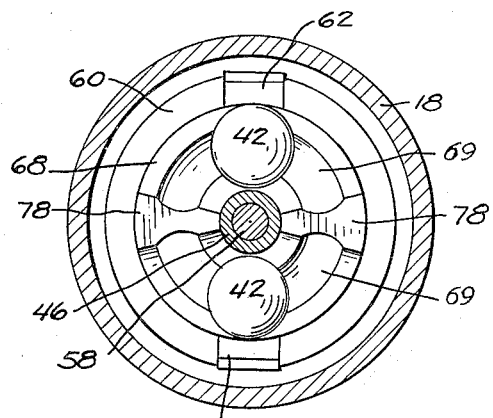
Fig. 5 is a sectional view taken on the line 5—5 of Fig. 3.

The forward face of cam member 41 is formed as a mirror image of the rear face of actuating member 68, and has grooves 76 designed to cooperate with the grooves 69 of member 68 to form a rotary anti-friction cam. It will be seen that the grooves 69 are symmetrical about the vertical center line of Fig. 5, so that rotation of carrier member 30 and cam member 41 relative to hammer 60 in either direction from the equilibrium position shown in Figs. 1, 3 and 5 will cause the member 68 to move forwardly. Each of the grooves 69, 76 slopes gradually upwardly from its middle point, in which the balls 42 rest when the tool is not operating (Figs. 1, 3 and 5), but the slope increases toward the ends of the groove, becoming abrupt adjacent each end of the groove, where a dividing ridge 73 is formed which prevents further movement of the ball in the groove and thereby ends the relative movement of members 41 and 68 until, at about the same instant, the hammer and anvil are disengaged as described hereinafter. Thus at the end of the stroke the balls cause a relatively rapid forward movement of the member 68, for a purpose to be described.

The cam actuating member 68 is connected to hammer 60 in such manner as to be non-rotatable but yieldingly reciprocable with respect thereto. In the example shown, this connection comprises (in addition to the cam members 70) a pair of plungers 80 (Fig. 1) fixed to member 68 and reciprocable in longitudinal bores formed in the hammer 60. Stiff springs 82 are mounted in these bores, to be compressed when the member 68 is moved forwardly and thereby to act as accumulator springs which store potential energy derived from the motor and deliver it to the stud 86 at intervals in the form of impacts.

Figure 4:
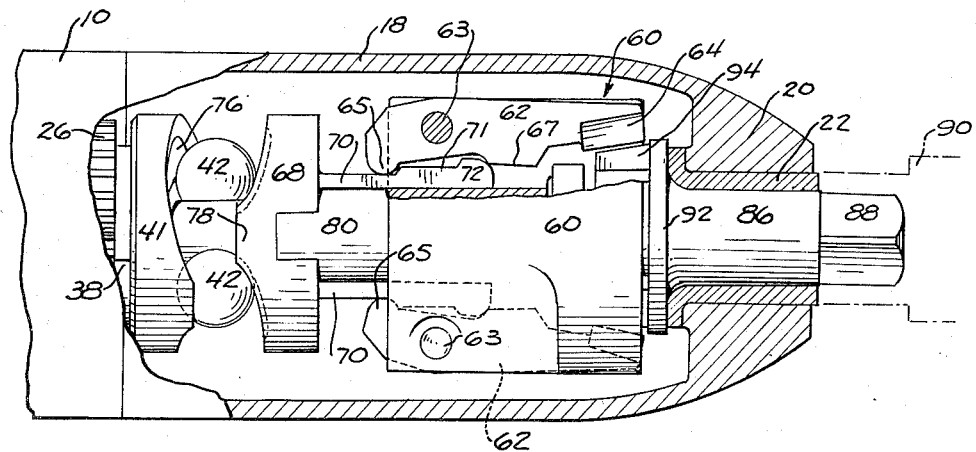
Fig. 4 is a fragmentary view similar to Fig. 3 but showing the parts in the positions which they occupy when the impact clutch has just released.

Mounted forwardly of hammer 60 and rotatable in the bushing 22, is a tool head or stud 86 having at its forward end a projection 88 of non-circular cross-section designed to fit into a correspondingly shaped opening in a socket 90 which, as indicated in dotted lines in Figs. 1 and 4, is designed to engage the work. The socket 90 is removable, and may be replaced by another socket or other work-engaging attachment to make the tool adaptable for different types and sizes of work. The rear portion of stud 86 is formed as an enlarged anvil 92, which is bored to receive the reduced end 59 of spindle 46 to form a bearing therefor. Projecting radially outwardly from anvil 92 are a plurality of anvil lugs 94 designed to be struck by the striker lugs 64 of hammer 60, and forming therewith an impact clutch.

It will be seen that the bearing 56 prevents forward movement of the hammer 60, while springs 82 prevent rearward movement thereof except for such rearward movement as may occur upon impact, and which it is not desirable to positively prevent, since the shock would in such case be transmitted through the housing to the operator instead of being absorbed by the springs 82.

The operation of the tool will now be described. Assume that the parts are in the equilibrium positions shown in Figs. 1, 2, 3 and 5, with the tool head in engagement with the member to be driven. The motor is started, to cause rotation of the spindle 46 in, say, the clockwise direction as viewed from the left of Fig. 1. This will act through the cam grooves 76 and 69, cam actuating member 68, hammer 60, striker lugs 64, and anvil lugs 94 to rotate the stud 86 and the work-engaging member 90 at the same speed as spindle 46. Until the nut approaches its seat it offers little resistance to rotation, and the parts remain in the same relative positions as shown.

As the nut reaches its seat, rotation of the stud 86 is retarded or temporarily arrested. Further rotation of the member 41 relative to the stud 86 causes cam grooves 76 to rotate relative to cam grooves 69, causing the balls 42 to move up the slopes of the grooves and thereby force the member 68 forwardly and compress the accumulator springs 82. When the torque reaction has increased to a predetermined amount, this action will proceed to the point indicated in Fig. 4, wherein the member 41 has rotated nearly 180° relative to the member 68, and the balls have moved through half that angle. Before this point is reached, the cam members 70 will engage and actuate the levers 62, causing the striker lugs 64 to be moved outwardly out of engagement with the anvil lugs 94, whereupon the member 68, being free, will move rearwardly to the equilibrium position shown in Fig. 1 and will simultaneously be accelerated in the clockwise direction under the influence of the accumulator springs 82 and the cam grooves 69 and 76. Hammer 60, being in effect splined to member 68, will also be accelerated in the clockwise direction. When the hammer has thus rotated freely through approximately 180° in this manner, the lugs 64, having been returned to the positions shown in Fig. 3 by the rearward motion of member 68 acting through cam members 70, will strike lugs 94 and impart a rotary blow thereto in the clockwise direction. At the instant when the blow is delivered, the parts are again in approximately the positions shown in Figs. 1, 2, 3 and 5. Continued application of power will again compress the springs 82, declutching the lugs 64 and 94 and producing a series of blows in rapid succession.

By reason of the structure above described, the force of the successive blows is substantially uniform, and the number of blows is therefore an indication of the tightness of the nut. When a predetermined number of blows has been delivered by the tool, the operator may release trigger 15 to cut off the power, and disengage the tool from the work.

The invention is suitable for driving elements having either right or left hand threads and for either tightening or loosening the threaded element. It will be seen that all of the drive elements are symmetrically arranged and are adapted to operate from either direction. The impacting faces of lugs 64 and 94 lie in substantially radial planes, which insures that the blow is evenly distributed over their surfaces irrespective of the direction of rotation.

Although the invention has been described with reference to a particular embodiment thereof, it may be embodied in other forms within the skill of artisans in this art, and is not limited except in accordance with the terms of the following claims.

I claim:

1. An impact wrench or the like comprising a drive spindle, an actuating member rotatable and longitudinally reciprocable on said spindle, a driving connection between the spindle and actuating member comprising opposed cam grooves in the spindle and actuating member and a ball riding in said grooves and operative upon rotation of the spindle at low torque to cause rotation without reciprocation of the actuating member and operative upon rotation of the spindle at high torque to cause reciprocation at an accelerated rate without corresponding rotation of the actuating member, a hammer rotatable and non-reciprocable on said spindle, an anvil having anvil lugs, levers carried by said hammer movable into and out of engagement with the anvil lugs, and reciprocable cam members carried by said actuating member for actuating said levers.

2. The invention defined in claim 1, comprising in addition a resilient torque responsive coupling between the spindle and the hammer operative upon relative rotation therebetween to store potential energy and operative upon release to deliver such energy to the hammer.

3. The invention defined in claim 2, comprising in addition a work-engaging head carried by said anvil, said hammer with its levers and said anvil forming in effect an impact clutch adapted to transmit the reaction of said head to said resilient coupling to stress the latter, said clutch being disengaged whenever said coupling has been stressed to a predetermined degree whereby the hammer is released and caused to accelerate under the influence of the coupling.

References Cited in the file of this patent

UNITED STATES PATENTS

| Number | Name | Date |
| --- | --- | --- |
| 2,160,150 | Jimerson et al. | May 30, 1939 |
| 2,259,824 | Lowder | Oct. 21, 1941 |
| 2,339,530 | Van Sittert et al. | Jan. 18, 1944 |

FOREIGN PATENTS

| Number | Country | Date |
| --- | --- | --- |
| 472,568 | Germany | Mar. 2, 1929 |